US012434119B2

(12) United States Patent
Zucchetto et al.

(10) Patent No.: US 12,434,119 B2
(45) Date of Patent: Oct. 7, 2025

(54) SYSTEM AND METHOD CONFIGURED TO CORRELATE GRIP PRESSURE AND ACTION QUALITY

(71) Applicant: Eaton Intelligent Power Limited, Dublin (IE)

(72) Inventors: Daniel Zucchetto, Dublin (IE); Padhraig Ryan, Keatingstown (IE)

(73) Assignee: Eaton Intelligent Power Limited, Dublin (IE)

( * ) Notice: Subject to any disclaimer, the term of this patent is extended or adjusted under 35 U.S.C. 154(b) by 285 days.

(21) Appl. No.: 18/006,992

(22) PCT Filed: Dec. 14, 2020

(86) PCT No.: PCT/EP2020/085994
§ 371 (c)(1),
(2) Date: Jan. 26, 2023

(87) PCT Pub. No.: WO2022/022845
PCT Pub. Date: Feb. 3, 2022

(65) Prior Publication Data
US 2023/0271069 A1 Aug. 31, 2023

(30) Foreign Application Priority Data
Jul. 31, 2020 (GB) ..................................... 2011923

(51) Int. Cl.
*A63B 60/46* (2015.01)
*A63B 24/00* (2006.01)

(52) U.S. Cl.
CPC .......... *A63B 60/46* (2015.10); *A63B 24/0006* (2013.01); *A63B 2060/464* (2015.10); *A63B 2220/51* (2013.01); *A63B 2220/833* (2013.01)

(58) Field of Classification Search
CPC ................ A63B 60/46; A63B 24/0006; A63B 2060/464; A63B 2220/51; A63B 2220/833; A63B 69/3632; G09B 19/0038; G09B 19/24; A61B 5/225
USPC ................ 473/201–206, 219, 223, 298, 299, 473/300–303, 523, 538, 551, 553, 568, 473/549, 461
See application file for complete search history.

(56) References Cited

U.S. PATENT DOCUMENTS 4,861,034 A * 8/1989 Lee ..................... A63B 69/3635
473/202
5,221,088 A * 6/1993 McTeigue .......... A63B 71/0622
473/218

(Continued)

FOREIGN PATENT DOCUMENTS

| WO | 92/12768 A1 | 8/1992 |
| WO | 2016/086259 A1 | 6/2016 |

*Primary Examiner* — Nini F Legesse
(74) *Attorney, Agent, or Firm* — LEYDIG, VOIT & MAYER, LTD.

(57) ABSTRACT

A system and method configured to receive or obtain action quality data related to a user's action with a tool, such as a swing with a golf club, and corresponding pressure data related to the user's grip on the tool during the action. The system and method are configured to determine a correlation between the pressure data and action quality data, which may be normalized to remove the effects of gravity if the data is collected with a sensor that is sensitive to gravity, and output at least one indicator related to the correlation.

20 Claims, 4 Drawing Sheets

(56) References Cited

U.S. PATENT DOCUMENTS

| | | | |
|---|---|---|---|
| 5,419,563 A * | 5/1995 | Abrams | A63B 69/3632 |
| | | | 473/202 |
| 5,542,676 A * | 8/1996 | Howe, Jr. | A63B 53/14 |
| | | | 473/549 |
| 5,681,993 A | 10/1997 | Heitman | |
| 7,362,231 B2 * | 4/2008 | Bos | G01L 5/22 |
| | | | 473/202 |
| 8,449,410 B1 | 5/2013 | Kaufman | |
| 8,944,929 B1 | 2/2015 | Smith | |
| 11,752,410 B2 * | 9/2023 | Mason | A63B 69/3632 |
| | | | 473/202 |
| 2003/0036436 A1 | 2/2003 | Casanova | |
| 2010/0144456 A1 | 6/2010 | Ahern | |
| 2011/0190069 A1 * | 8/2011 | Slane | A63B 53/14 |
| | | | 473/202 |
| 2018/0117432 A1 * | 5/2018 | Aliberti | A63B 53/14 |

* cited by examiner

SYSTEM AND METHOD CONFIGURED TO CORRELATE GRIP PRESSURE AND ACTION QUALITY

FIELD OF THE INVENTION

The present invention relates to a system and method configured to correlate grip pressure and action quality and finds particular, although not exclusive, utility in a system and method for providing an athlete, such as a golfer or tennis player, with feedback related to their grip on their sports equipment, such as a golf club or tennis racket, and the resulting sporting action made with said grip.

BACKGROUND TO THE INVENTION

One of the most important factors affecting the performance of athletes in club, bat or racket based sports is the athlete's grip on their club, bat or racket. Minor changes in grip position and force can have a significant impact on the outcome of a shot or other sporting action. For example, in golf, a shot taken with a minor change in a golfer's grip, such as a 1° change in angle of the golfer's hands around the shaft, may result in a 10 metre change in shot length or direction of the ball. Golfers, along with other athletes, may vary their grip depending on their desired shot outcome. Typically, athletes understand that altering their grip will alter the shape, flight and distance, for example, of their shot. It is common, typically although not exclusively with less experienced athletes, for changes or differences to occur between shots even when the athlete intends to use the same grip. Some athletes may aim to use a highly consistent grip placement and force whilst altering some other aspect of their swing. For a right-handed golfer, a swing with a so-called strong grip, which is a term used to describe a grip in which the golfer's left thumb and index finger align with their shoulder and/or neck when addressing a shot, may result in the ball travelling further left than the same swing made with a so-called neutral or weak grip. A strong grip is also understood to close a clubface and effectively reduce the loft of the club, resulting in a shot that flies lower and travels further when compared to a shot made with a neutral or weak grip.

Furthermore, the user's grip may have an effect on their sporting action, technique, physical action and/or physical capabilities. For example, a golfer may find that swings made with a so-called strong grip result in a swing with higher club head speed, or a steeper angle of attack, when compared to a so-called weak or neutral grip. Accordingly, the athlete's grip has a large impact on the athlete's sporting action and shot outcome.

Typically, athletes receive feedback on their grip, and the resulting shot, through coaching or practice, often including video feedback. However, the athlete's grip is not the only factor that affects their swing and the outcome of their shot. As there are many factors affecting shot outcomes and small changes in the athlete's grip can have a large impact on the shot outcome, it is difficult for inexperienced athletes and coaches to correctly diagnose and fix grip faults. Furthermore, even elite level athletes and coaches may find it difficult to correctly diagnose and fix grip faults. In addition, although one golfer may see an improvement in their swing by strengthening their grip, another golfer with an identical initial swing may see an improvement in their swing by weakening their grip.

Therefore, it is desirable to provide a system and method capable of providing a user with some correlation between their grip and the resulting action performed with said grip, so that the user may choose and adjust their grip accordingly. Objects and aspects of the present invention seek to provide such a system and method.

SUMMARY OF THE INVENTION

According to a first aspect of the present invention, there is provided a system configured to correlate grip pressure and action quality, the system comprising: a grip pressure sensor positionable, in use, on a tool configured to be gripped by a user; an action quality sensor positionable, in use, on the tool or the user, the action quality sensor configured to measure a quality of an action; and a processor configured to: receive action quality data from the action quality sensor; determine information related to the occurrence of an action including a motion of the tool; receive pressure data from the grip pressure sensor, the pressure data related to the pressure of a user's grip on the tool during the action; determine a correlation between the pressure data and the action quality data such that a relationship between the user's grip on the tool during the action and a quality of the action is inferred; and output a first indicator corresponding to the correlation between the pressure data and the action quality data.

A key advantage of the present invention is that a user may be provided with a correlation between their grip and a quality or qualities of their action, and indicator data related to the correlation, which may then allow the user to select a grip that provides their desired action more consistently or provides a more desirable action. For example, a golfer may take several swings each with different grips, such as so-called strong, neutral and weak grips, and may be provided with a correlation between each different grip and a quality or characteristic of their golf swing.

The system may be configured to determine an inference on the correlation between kinematics and pressure, which can then be used to provide feedback to a user. A tactile interface may be used to provide the feedback.

The action quality may be a characteristic of the action. For example, if the action is a golf swing, the action quality may be a swing speed, a swing path, an angle of attack, a face angle at impact, plane, tempo, club head alignment at the address position at the beginning of the golf swing action or any other known characteristic of a golf swing. As an alternative example, if the action is the use of a drill, the action quality may be a hand steadiness, a linearity of the action or any other desirable quality or characteristic.

The grip pressure sensor may be positionable, in use, on the tool in an area intended to be gripped by a user. For example, the grip pressure sensor may be positioned, in use, on a handle of the tool. The grip pressure sensor may comprise an array of pressure sensors. The array of pressure sensors may comprise at least 8 pressure sensor elements. The array of pressure sensors may be arranged in an 8×1 grid pattern. The array of pressure sensors may comprise at least 368 pressure sensor elements. The array of pressure sensors may be arranged in an 8×46 grid pattern. The array of pressure sensors may comprise at least 1000 sensors. The sensors may be provided at a density of at least 1 sensor per square centimetre, preferably at least 2 sensors per square centimetre, more preferably at least 4 sensors per square centimetre. Each sensor element may have a size of approximately 0.5 centimetres by 0.5 centimetres. Accordingly, providing 4 sensors per square centimetre at a size of 0.5 centimetres by 0.5 centimetres may cover the entire area with sensor elements. Other sensor element sizes and densities are envisaged. The array of pressure sensors may be arranged in a regular grid pattern. Alternatively, the array of pressure sensors may be arranged in an irregular grid pattern. Accordingly, more sensors may be provided in the regions of the tool that are more likely to be gripped by the user. For example, if the tool is a golf club and the sensors are positioned on the grip of the golf club, it is likely that the user will grip the golf club in a middle portion of the grip away from the ends of the grip. Therefore, more sensors may be provided in the middle portion of the grip.

The tool may be a golf club. Alternatively, the tool may be another piece of sports equipment, such as a baseball bat, a tennis racket, a badminton racket, a cricket bat, a hockey stick, a hurley, a lacrosse stick, a table tennis paddle, a fishing rod, or any other known sports equipment configured to be held by a user. Accordingly, an athlete may be provided with a correlation between their grip on their sports equipment and the resulting action typically seen. For example, a golfer may be provided with a correlation between their grip on their golf club and the resulting golf swing.

Alternatively, the tool may be a training aid for an automated system, such as a robotic arm or other mechanical device configured to grip an object. The grip of the robotic arm may have an effect on the ability of the robotic arm to carry out some movements effectively and accurately. The automated system may be programmed to grip the training aid and move the object in a predetermined way. The system may then determine and provide an indicator related to the correlation between the grip of the automated system on the training aid and the movement of the training aid. Accordingly, the effect of one or more gripping arrangement or methods of the automated system may be compared and a preferred gripping arrangement or method selected.

As a further alternative, the tool may be a medical device intended for use in detecting a medical problem, such as a neurological or physiological problem. For example, a user may be asked to grip and move the medical device in a certain way, and the indicator corresponding to the correlation between the pressure data and the action data, which may be normalized if the data is collected with a sensor that is sensitive to gravity, may be used to determine whether some part of the user's grip is incorrect or is not allowing the user to move the tool as intended. This may then allow a medical professional to determine if a neurological or physiological problem exists. Alternatively, the medical device may be used during training for medical professionals or others in medical or care settings. For example, the tool may be a training device for an auto-injector, which is a spring-loaded single use syringe typically used for at home administration of drugs. Auto-injectors typically require a relatively firm and linear injection. A user may find, via training with the medical device, that holding the auto-injector with a specific grip results in an adequate use of the auto-injector, whereas another grip may not result in an adequate use of the auto-injector.

Alternatively, the tool may be a hand tool, such as a chisel, a screwdriver, a drill or any other known tool. The way in which the user holds the tool may have an effect on the movement of the tool during an action and therefore may have an effect on the outcome of their action. The user may find that a particular grip results in improved operation of the tool. For example, a user may find that they are more likely to drill a hole in a straight line with minimal damage to surrounding materials by using one particular grip on a drill, when compared to another grip the user may use. Accordingly, the system may be used to allow the user to adjust their grip to the grip that provides the more preferable results. Alternatively, the tool may be a hand tool training device. The training device may be used during instruction or other training to provide a user with feedback related to their grip on the tool and the resulting use of the tool.

The action may be a sporting action. For example, the action may be a swing made with a piece of sports equipment, such as a golf swing. Alternatively, the action may be a training action, performed during the training of a user or an automated machine, or a crafting action, performed during crafting, construction or some other profession or hobby.

The pressure data may be related to the user's grip on the tool during the action. For example, the pressure data may be related to a golfer's grip on their golf club. Pressure data may be obtained at a single point in time or over a period of time. The pressure data may be obtained continuously or intermittently. Pressure data may be obtained throughout the action.

The action quality data may be related to a quality of the user's action. The quality may be a characteristic of the action. For example, a quality or characteristic of a golf swing may be a swing speed, a swing path, an angle of attack, a face angle at impact, plane, tempo, club head alignment at the address position at the beginning of the golf swing action or any other known characteristic of a golf swing.

The processor may be further configured to normalize the action quality data to remove effects of gravity on the action quality sensor. This step may be carried out if the action quality sensor comprises an accelerometer or some other sensor that provides an output that is affected by gravity.

The processor may be configured to receive data corresponding to several actions before determining the correlation. For example, the processor may be configured to receive data corresponding to 2, 5, 10, 15, 20, 30 or more actions before determining the correlation. In this way, a more accurate correlation may be determined. Small changes in grip may have large effects on action outcome. Accordingly, it may be difficult to determine an accurate correlation from a small sample of actions. Additionally, two actions performed with identical grips may not have identical results. Accordingly, data corresponding to multiple actions may be required to identify a common or frequently seen action result with a certain grip. However, in some circumstances, data corresponding to a single action may be sufficient to determine the correlation with an acceptable accuracy.

The processor may be further configured to receive action outcome data corresponding to an outcome of the action. The action outcome data may be received from a user. The system may further comprise a user input device. The user input device may be configured to allow a user to input the action outcome data. The user may input, via a user interface or otherwise, the action outcome data. For example, a golfer may input shot distance, direction, flight shape and/or any other outcome of their golf shot. The user may use one or more independent or standalone systems to obtain the outcome data. For example, a user may use a GPS system to determine a distance between a start and end point of a golf shot.

As a further example, the user may use a laser rangefinder to measure the distance of their golf shot. As a further yet example, the user may use a launch monitor, such as a radar based system, to obtain data related to the outcome of the golf swing.

The system may further comprise an action outcome sensor. The action outcome sensor may be configured to obtain the action outcome data by measurement or determination of an outcome of the action. The action outcome sensor may be further configured to provide the action outcome data to the processor. The action outcome sensor may comprise any or each of the sensors or systems discussed above in relation to the user providing the action outcome data.

The processor may be further configured to determine a further correlation between the pressure data or the action quality data, which may be normalized if the data is collected with a sensor that is sensitive to gravity, and the action outcome data. In this way, a correlation between the grip of the user and the action outcome may be determined. Some users may find it useful to be provided with a correlation between their grip and the outcome of their action, rather than a correlation between their grip and a quality of their action. A user may not have the knowledge or skill to determine or identify a link or relationship between the action quality and action outcome and may therefore find a correlation between grip and action outcome more useful.

The processor may be further configured to output a second indicator corresponding to the further correlation. Accordingly, the user may be provided with a first indicator related to the correlation between their grip and the action quality and a second indicator related to the correlation between their grip and the action outcome.

The processor may be configured to estimate the action outcome data based on the action quality data. For example, the outcome of a golf swing may be estimated based on swing characteristics, such as club head speed and swing path. In this way, the user need not enter action outcome data and the system does not require one or more dedicated sensors to obtain action outcome data. The processor may be configured to estimate the action outcome further based on environmental data. The processor may receive and/or obtain environmental data related to wind speed, wind direction, altitude, air density, humidity, air temperature or any other environmental factor. The system may comprise one or more environmental sensors configured to obtain the environmental data. Alternatively or additionally, a user may input the environmental data. The processor may be configured to obtain environmental data via the Internet or some other network. The processor may be configured to estimate the environmental data or use predetermined or pre-set environmental data, particularly in the absence of environmental data being obtained or provided.

The processor may be configured to receive a notification, or determine, that an action has been initiated. Accordingly, the data used to determine the correlation may be the data following the initiation of the action and therefore is related to the action only. The processor may be configured to determine the initiation of an action based on the action quality data or the pressure data using a rules-based method or a machine learning method.

The processor may be configured to receive a notification, or determine, that a plurality of action phases have been initiated. The processor may be configured to determine at least two phases of an action. For example, a golf swing may comprise several phases including address position, backswing, transition, downswing, impact and follow-through. Accordingly, the correlation may be determined for each of the plurality of action phases. One or more of the plurality of phases may be considered. For example, the address position, backswing, transition, downswing and impact may be considered, whilst the follow-through may not be considered. A spike in grip pressure may correspond to the impact. A spike in grip pressure may be seen immediately before and after the impact, with a reduction in grip pressure at impact due to the shock caused by the impact. Data following the spike or spikes may not be considered. During impact, the golf club may rotate relatively quickly before returning back to the prior orientation. A golfer may not be aware that this rotation has occurred. Relatively large readings from the action quality sensor, such as a gyroscope, may also be received during impact. The spike in grip pressure and/or the relatively large readings from the action quality sensor may exceed a maximum value for the grip sensor and action quality sensor respectively. However, the magnitude of the relatively large readings during impact may not be important.

The system may be configured to provide the first and/or second indicator, other data and/or feedback to a user in real time. The system may be configured to continually output the first and/or second indicator, other data and/or feedback to the user. Continually may be continuous or intermittent. Alternatively, or additionally, the system may be configured to provide historical data to a user. In this way, the user may track their progress or recall and recreate previous grips saved in the historical data. The historical data may also be accessed by a coach, teacher or instructor to enable them to prepare and provide feedback to the user.

The processor may be configured to use a linear regression model to determine the first or further correlation. Alternatively or additionally, the processor may be configured to use logistic regression, a support vector machine, a decision tree or variant thereof such as a random forest or gradient boosted machine, a neural network, Pearson Correlation Coefficient and/or any other known algorithm or method to determine the first or further correlation. The processor may be configured to receive or determine a user status. The user status may comprise age, gender, injury status, golfing handicap, left or right-handedness, a physical disability, user height, user physical dimensions, type of golf club used (e.g. 8-iron, driver, etc.), model of golf club used, or any other status. The user status may be used to characterize the user, as discussed herein, and/or used with the linear regression model, and/or other algorithm or method as described herein, to more accurately determine the correlation.

The action quality sensor may comprise one or more sensors selected from the range: an accelerometer, a gyroscope, a magnetometer and a microphone. In this way, the motion of the object may be measured or determined.

The action quality sensor may be configured to operate with a sample rate of at least 100 Hz. The action quality sensor may be configured to operate with a sample rate of at least 1000 Hz. An action, or phases of an action, may last only milliseconds. Accordingly, a relatively high sample rate may be required to provide adequate data to determine the correlation.

The system may further comprise a feedback device configured to provide a user with feedback related to the first indicator.

The feedback device may comprise a haptic or tactile feedback device. The haptic or tactile feedback device may be operable to provide a user gripping the object with haptic or tactile feedback. Haptic or tactile feedback may be any form of feedback that the user is able to feel. The haptic or tactile feedback device may be on, embedded into, or under a portion of the tool such as a grip of a golf club. As such, the feedback device may provide a user gripping the tool with a feeling related to their grip via their hands. The haptic or tactile feedback device may be configured to operate by changing temperature, applying force, vibrating, or any other form of mechanical motion, and/or otherwise actuating to provide feedback. For example, if the grip pressure falls outside of the desired pressure range, the feedback device may vibrate. Vibration may provide a form of rapid feedback. As a further example, during a golf swing, if the golfer is moving their club back during the backswing on an incorrect plane, they may be alerted or provided with feedback to that extent by vibration. As such, the user may be provided with feedback related to the nature of their action.

The haptic or tactile feedback device may be distributed across the tool. The haptic or tactile feedback device may be distributed across a portion of the tool covered by the pressure sensor, such as a grip of a golf club. In this way, the feedback may relate to any portion of the user's grip. Alternatively, the haptic or tactile feedback device may be positioned away from the tool. For example, the haptic or tactile feedback device may be positioned on a wearable object, such as a wristband, an armband or a glove. As a further example, the haptic or tactile feedback device may be a smartphone operable by the processor, via wireless communication or any other communication method, to vibrate.

Alternatively or additionally, the feedback device may comprise a visual feedback device operable to provide a user gripping the tool with visual feedback. The visual feedback device may comprise a display. The display may be wearable, such as eyewear, or standalone. The visual feedback device may comprise a smart phone or a smart watch. For example, the smart phone or smart watch screen may be used to provide visual feedback.

Alternatively or additionally, the feedback device may comprise an audible feedback device operable to provide a user gripping the tool with audible feedback. The audible feedback device may comprise a speaker. The speaker may comprise a loudspeaker, headphones and/or earphones.

The feedback may comprise an expected or regular outcome corresponding to a user's grip on the tool. For example, a user may grip a golf club and be provided with feedback including an expected swing or shot outcome. A user may then adjust their grip and be provided with feedback including an expected swing or shot outcome for the adjusted grip. The user may adjust their grip until a desired expected outcome is achieved.

The processor may be configured to categorize the user into one of a plurality of predetermined categories of users grouped together based on a similarity of at least one characteristic of the users. The expected or regular outcome may be determined based on predetermined data related to the actions of users within the predetermined category within which the user is categorized. In this way, historical data related to other users within the same category as the user may be used to determine the correlation. As such, the user may be able to determine an accurate correlation without first performing several actions, and the user may be alerted to novel techniques to enhance their performance.

The processor may be configured to determine a path of the tool travelled during the action. The feedback device may comprise a display configured to display the path of the tool. For example, the processor may determine the path of a golf club during a golf swing and display the path travelled by the golf club, or a portion of the golf club such as the club head, during the swing.

The processor may be configured to receive or determine a desired action quality. The processor may be further configured to determine a corresponding grip that is expected to provide the desired action quality. The corresponding grip may be dependent on the user category as described herein. The system may provide feedback including the corresponding grip. In this way, the user may enter their desired action quality and receive feedback related to the grip required to achieve said desired action quality.

The system may be further configured to determine and output a difference between a user's grip and the corresponding grip that is expected to provide the desired action quality. As such, the user may adjust their grip accordingly.

The system may further comprise a further pressure sensor configured to measure a force applied by a user during the action to an object. The further pressure sensor may be configured to measure a pressure applied by a user's feet to the ground during the action. The pressure applied by the user's feet to the ground during a golf swing may have an impact on the swing or outcome.

The processor may be operatively connected to the action quality sensor and/or pressure sensors. Accordingly, the processor may be able to communicate with the action quality sensor and/or pressure sensor directly. The processor may be on, or in, the tool. Alternatively, the processor may be spaced and separate from the tool. The processor may be an edge computing device. The system may further comprise a rechargeable battery configured to supply power to the processor. Alternatively, or additionally, the system may comprise a non-rechargeable battery configured to supply power to the processor. Alternative power storage devices, such as supercapacitors, are envisaged.

According to a second aspect of the present invention, there is provided a method configured to correlate grip pressure and action quality, the method comprising the steps: receiving, from an action quality sensor, action quality data related to an action of a user with a tool; determining, with the processor, or receiving, from a user, information related to the occurrence of an action including a motion of the tool; receiving, from a grip pressure sensor, pressure data, wherein the pressure data is related to the pressure of a user's grip on the tool during the action; determining, with the processor, a correlation between the pressure data and the action quality data such that a relationship between the user's grip on the tool during the action and a quality of the action is inferred; and outputting, with the processor, a first indicator corresponding to the correlation between the pressure data and the action quality data.

The method may include each and/or every step carried out during operation of the processor of the first aspect. Accordingly, each feature of the first aspect may be included in the second aspect of the present invention.

DETAILED DESCRIPTION

Figure 1:
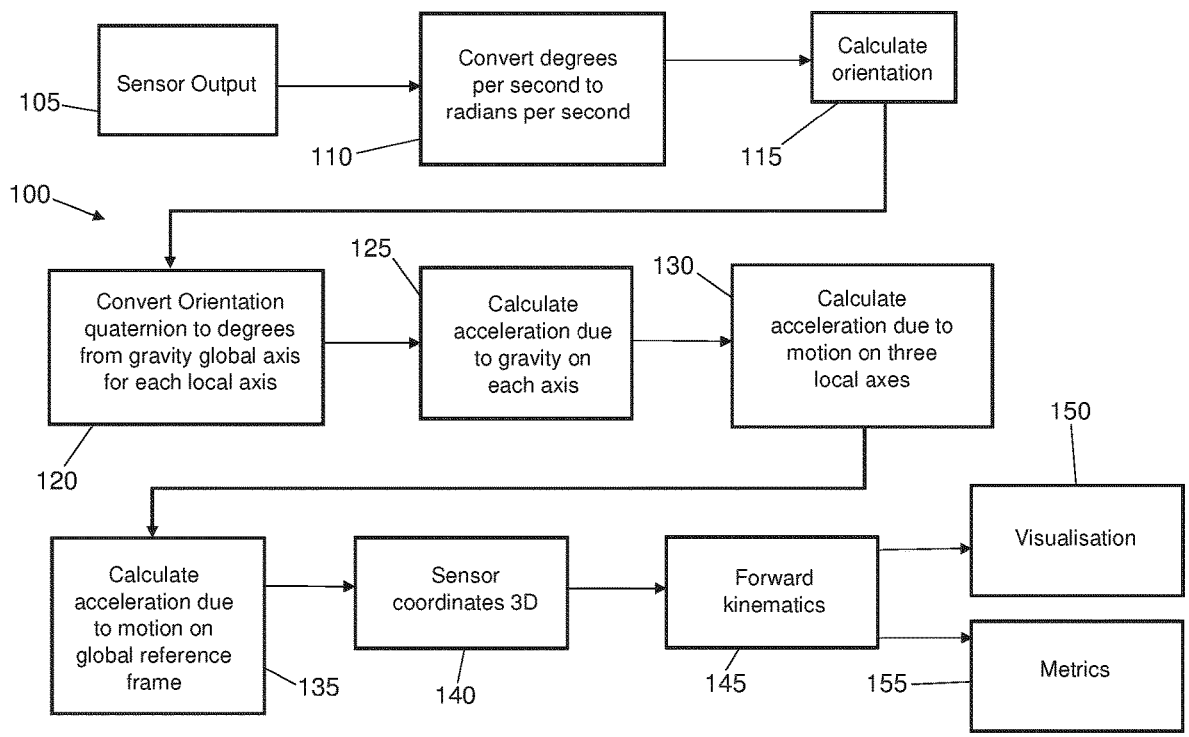
FIG. 1 is a first method diagram including the steps of an example method of quantitative analysis of motion.

FIG. 1 is a first method diagram 100 including the steps of an example method of quantitative analysis of motion.

The first step is to receive action quality sensor output 105. In this example, the action quality sensor includes an accelerometer and a gyroscope.

The next step is to convert the data 110 from degrees per second to radians per second, such that the data is in a form more suitable for further manipulation and processing.

Next, the orientation is calculated 115. The orientation may be expressed in quaternions. The next step is to convert the orientation quaternion to degrees 120 from gravity global axis for each local axis. In this step, the quaternion may be converted into a 3×3 Rotation Matrix, or some other suitable conversion may be performed.

The next step is to calculate acceleration due to gravity 125 on each axis. To do so, the gravity vector may be multiplied by the Rotation Matrix to project the force of gravity onto the 3 axes of the accelerometer.

Next, acceleration due to motion on three local axes is calculated 130. To do so, the acceleration due to gravity 125 on each axis is subtracted from the data received at the first step 105, leaving only the acceleration due to motion.

The acceleration due to motion on a global reference frame is then calculated 135. The local acceleration calculated in step 130 is multiplied by the transpose of the Rotation Matrix to obtain the acceleration vectors on a global reference frame.

The next step 140 is to add the updated velocity to the sensor coordinates from time N−1, wherein N−1 is the previous time. If time=0, or if a zero velocity update has occurred, the updated velocity is added to (0,0,0).

The next step is to calculate forward kinematics 145. The position of the golf club head may be calculated in 3D space. The initial position in 3D space, relative to the sensor position wherein the sensor position is expressed as (0,0,0), is multiplied by the 3×3 Rotation Matrix, to rotate the vector, and then translated to reflect the position relative to the actual coordinates of the sensor.

Finally, a visualisation 150 and metrics 155 related to the action is output. The visualisation 150 may include movement and rotation of the golf club in 3D space. Other movements are envisaged. The metrics 155 may relate to features or characteristics such as club head speed, plane and tempo of a golf swing. Other characteristics are envisaged.

Figure 2:
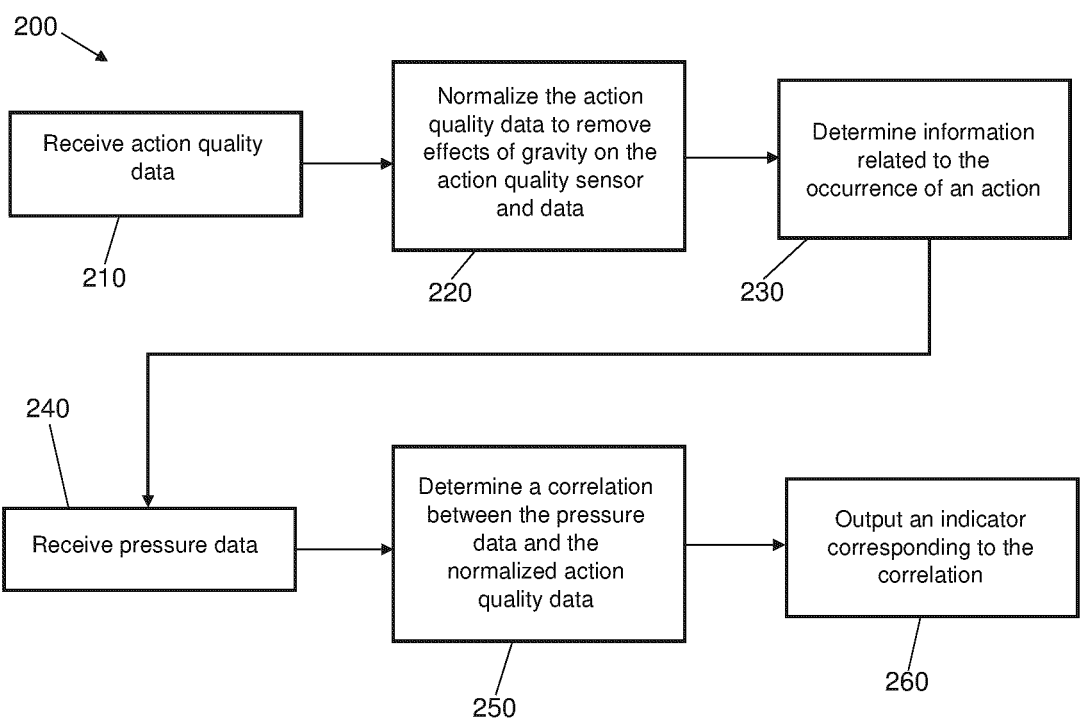
FIG. 2 is a second method diagram including the steps of an example method configured to correlate grip pressure and action quality.

FIG. 2 is a second method diagram 200 including the steps of an example method configured to correlate grip pressure and action quality. The steps of the method may be carried out by a processor. The grip pressure may be the user's grip on a tool, such as a golf club, and the action quality may relate to the user's action with said tool, such as a golf swing.

The first step is to receive action quality data 210 related to an action of a user with a tool. The action quality data may be received from an action quality sensor such as an accelerometer, a gyroscope or a magnetometer. If the sensor is an accelerometer, the next step is to normalize the action quality data 220 to remove effects of gravity on the action quality sensor and data. As such, this step is optional and dependent on the sensor or sensors used. Accordingly, the forces on the action quality sensor resulting from the user's action may be determined, and the information may not be skewed due to gravity.

The next step is to determine information 230 related to the occurrence of an action. The information may be received from a user via a user interface or otherwise. For example, the information related to the occurrence of an action may be the initiation of a golf swing. Accordingly, the occurrence of an action may include a motion of the tool, such as a golf club.

The next step is to receive pressure data 240, wherein the pressure data is related to the pressure of a user's grip on the tool during the action. The pressure data may be received from a pressure sensor or array of pressure sensors positioned on the tool, such as on the grip of a golf club. Receiving this data after the occurrence of an action has been identified may means that analysis is performed only on pressure data related to the action. However, the pressure data may be received at any time, even before the action quality data, and considered in whole or in part, as appropriate.

The next step is to determine a correlation 250 between the pressure data and the action quality data, which may be normalized if the data is collected with a sensor that is sensitive to gravity. Accordingly, a relationship between the user's grip on the tool during the action and a quality of the action may be inferred. Any suitable model, such as a linear regression model or Pearson Correlation Coefficient, may be used to determine the correlation.

Finally, the last step is to output a first indicator 260 corresponding to the correlation between the pressure data and the action quality data, which may be normalized if the data is collected with a sensor that is sensitive to gravity. The first indicator may then be used by the user to identify an expected or usual outcome corresponding to their grip on their tool, and adjust their grip accordingly.

Figures 3A, 3B, 3C:
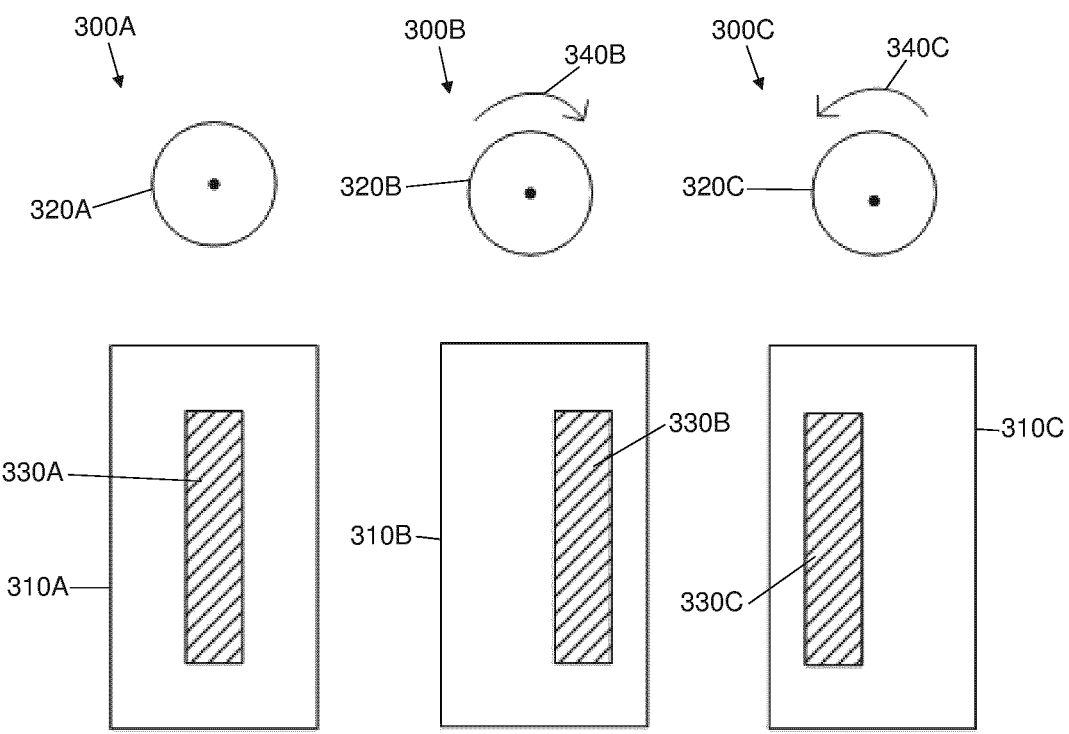
FIGS. 3A, 3B and 3C are schematic diagrams of a golf club grip showing the differences in pressure applied to the golf grip to rotate a golf club.

FIGS. 3A, 3B and 3C are schematic diagrams 300A, 300B, 300C of a golf club grip 310A, 310B, 310C showing the differences in pressure applied to the golf grip 310A, 310B, 310C to rotate a golf club. Each of FIGS. 3A, 3B and 3C show a schematic plan view of the butt end 320A, 320B, 320C and a schematic plan view of the golf grip 310A, 310B, 310C shown unwrapped and flattened into a planar state, for visualisation only.

FIG. 3A shows a pressure applied predominantly to a central region 330A of a golf grip 310A. As the pressure is applied to a central region 330A, no rotation of the golf club is seen, which may be observed for example during a particular phase of a golf swing. FIG. 3B shows a pressure applied to a region right of centre 330B of a golf grip 310B. As the pressure is applied to a region right of centre 330B, a clockwise rotation of the golf club is seen, when viewing the butt end 320B of the golf grip, as noted by arrow 340B. FIG. 3C shows a pressure applied to a region left of centre 330C of a golf grip 310C. As the pressure is applied to a region left of centre 330C, an anticlockwise rotation of the golf club is seen, when viewing the butt end 320C of the golf grip, as noted by arrow 340C.

Accordingly, the example discussed with reference to FIGS. 3A to 3C shows how it is possible to determine movements of the golf club based on the pressure applied to the grip alone. Other movements of the golf club are envisaged. For example, the magnitude of pressure from three fingers of the hand, such as the middle to little fingers, relative to the magnitude of pressure from the thumb and index finger, may influence the degree to which the wrist can rotate the club during the golf swing. Furthermore, other pieces of sporting equipment and other tools are envisaged.

Figure 4:
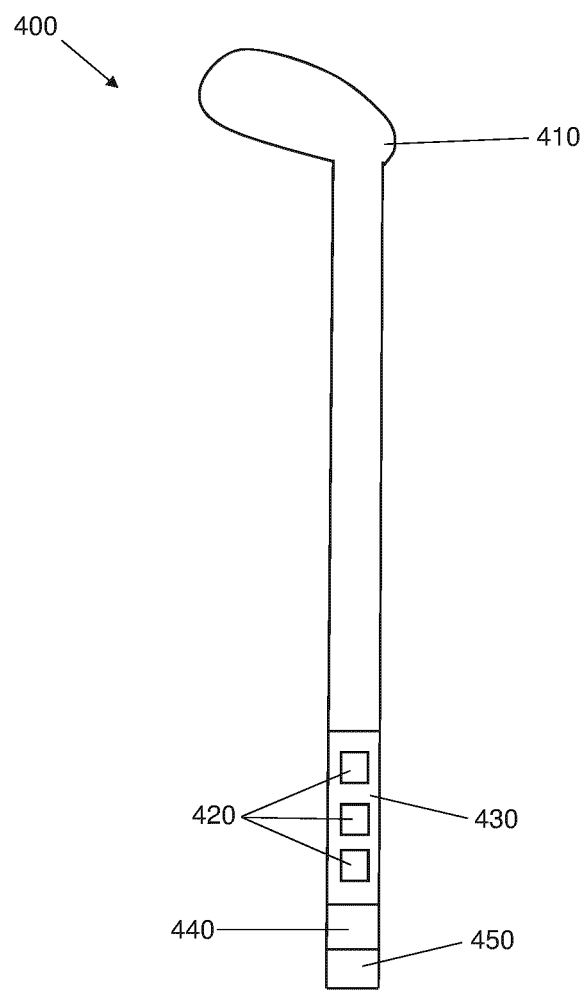
FIG. 4 is a schematic diagram of a system configured to carry out the method of FIG. 2.

FIG. 4 is a schematic diagram of a system 400 configured to carry out the method of FIG. 2. The system 400 is shown to be positioned on a golf club 410, although other pieces of sports equipment and other tools are envisaged. The system 400 includes an array of pressure sensors 420 embedded into the grip 430 of the golf club. Only three pressure sensors 420 are shown for clarity, although any number of sensors may be provided. The pressure sensors 420 are configured to measure the pressure applied to the grip 430 of the golf club by the golfer's hands and provide the pressure data to a processor 440, also positioned within the grip 430 of the golf club.

A sensor bundle 450 including an accelerometer and a gyroscope is positioned at the butt end of the golf club. The sensor bundle 450 may be integral with, or removable from, the grip 430 of the golf club. The sensor bundle 450 is configured to measure the movement of the golf club 410, particularly during a golf swing made by the user with the golf club 400, and obtain the action quality data. The sensor bundle 450 is configured to provide the action quality data to the processor 440.

The processor 440 is configured to carry out the method of FIG. 2 and output the first indicator corresponding to the correlation between the pressure data and the action quality data, which may be normalized if the data is collected with a sensor that is sensitive to gravity.

The invention claimed is:

1. A system configured to correlate grip pressure and action quality, the system comprising:
    a grip pressure sensor positionable, in use, on a tool configured to be gripped by a user;
    an action quality sensor positionable, in use, on the tool or the user, the action quality sensor configured to measure a quality of an action; and
    a processor configured to:
        receive action quality data from the action quality sensor;
        determine information related to the occurrence of an action including a motion of the tool;
        receive pressure data from the grip pressure sensor, the pressure data related to the pressure of a user's grip on the tool during the action;
        determine a correlation between the pressure data and the action quality data such that a relationship between the user's grip on the tool during the action and a quality of the action is inferred; and
        output a first indicator corresponding to the correlation between the pressure data and the action quality data.

2. The grip pressure to action quality correlation system of claim 1, wherein the tool is a golf club, the grip pressure sensor is positionable, in use, adjacent to the grip of the golf club, the action is a golf swing, the pressure data is related to the user's grip on the golf club and the action quality data is related to a quality of the user's golf swing.

3. The grip pressure to action quality correlation system of claim 1,
    wherein the tool is sports equipment that comprises a grip configured to be gripped by the user and the action is a swing of the sports equipment,
    wherein determining the correlation between the pressure data and the action quality data comprises using an algorithm comprising a linear regression model, a logic regression, a support vector machine, a decision tree, a neural network, or a Pearson correlation, the action quality data and the pressure data being inputs to the algorithm,
    wherein the action quality sensor comprises an accelerometer and a gyroscope, and the action quality data comprises acceleration data and orientation data, and
    wherein the processor is further configured to normalize the action quality data to remove effects of gravity on the action quality sensor before inputting the action quality data into the algorithm.

4. The grip pressure to action quality correlation system of claim 1, wherein the processor is further configured to:
    receive action outcome data corresponding to an outcome of the action;
    determine a further correlation between the pressure data or the action quality data and the action outcome data; and
    output a second indicator corresponding to the further correlation.

5. The grip pressure to action quality correlation system of claim 4, wherein the system further comprises an action outcome sensor configured to:
    obtain the action outcome data by measurement or determination of an outcome of the action; and
    provide the action outcome data to the processor.

6. The grip pressure to action quality correlation system of claim 4, wherein the system further comprises a user input device configured to allow a user to input the action outcome data.

7. The grip pressure to action quality correlation system of claim 4, wherein the processor is configured to estimate the action outcome data based on the action quality data.

8. The grip pressure to action quality correlation system of claim 1, wherein the processor is configured to receive a notification, or determine, that an action has been initiated.

9. The grip pressure to action quality correlation system of claim 8, wherein the processor is configured to determine the initiation of an action based on the action quality data or the pressure data using a rules-based method or a machine learning method.

10. The grip pressure to action quality correlation system of claim 9, wherein the processor is configured to determine at least two phases of an action.

11. The grip pressure to action quality correlation system of claim 1,
    wherein determining the correlation between the pressure data and the action quality data comprises using a linear regression model, a logic regression, a support vector machine, a decision tree, a neural network, or a Pearson correlation, and
    wherein the action quality sensor comprises one or more sensors selected from the range: an accelerometer, a gyroscope, a magnetometer and a microphone, and the action quality data comprises swing acceleration data, rotational motion data, orientation data, or impact sound data.

12. The grip pressure to action quality correlation system of claim 1, wherein the action quality sensor is configured to operate with a sample rate of at least 100 Hz.

13. The grip pressure to action quality correlation system of claim 1, wherein the system further comprises a feedback device configured to provide a user with feedback related to the first indicator.

14. The grip pressure to action quality correlation system of claim 13, wherein the feedback comprises an expected or regular outcome corresponding to a user's grip on the tool.

15. The grip pressure to action quality correlation system of claim 14, wherein the processor is configured to categorize the user into one of a plurality of predetermined categories of users grouped together based on a similarity of at least one characteristic of the users, and the expected or regular outcome is determined based on predetermined data related to the actions of users within the predetermined category within which the user is categorized.

16. The grip pressure to action quality correlation system of claim 13, wherein the processor is configured to determine a path of the tool travelled during the action, and the feedback device comprises a display configured to display the path of the tool.

17. The grip pressure to action quality correlation system of claim 1 wherein the processor is configured to receive or determine a desired action quality and determine a corresponding grip that is expected to provide the desired action quality.

18. The grip pressure to action quality correlation system of claim 17, wherein the system is further configured to determine and output a difference between a user's grip and the corresponding grip that is expected to provide the desired action quality.

19. The grip pressure to action quality correlation system of claim 1, wherein the system further comprises a further pressure sensor configured to measure a force applied by a user during the action to an object, further wherein the further pressure sensor is configured to measure a pressure applied by a user's feet to the ground during the action.

20. A method configured to correlate grip pressure and action quality, the method comprising the steps:
   receiving, from an action quality sensor, action quality data related to an action of a user with a tool;
   determining, with the processor, information related to the occurrence of an action including a motion of the tool;
   receiving, from a grip pressure sensor, pressure data, wherein the pressure data is related to the pressure of a user's grip on the tool during the action;
   determining, with the processor, a correlation between the pressure data and the action quality data such that a relationship between the user's grip on the tool during the action and a quality of the action is inferred; and
   outputting, with the processor, a first indicator corresponding to the correlation between the pressure data and the action quality data.

* * * * *